United States Patent [19]
Strickland

[11] 3,743,848
[45] July 3, 1973

[54] WIND DRIVEN POWER PRODUCING APPARATUS

[76] Inventor: Nathaniel Strickland, 1105 Ortega St., Carlsbad, N. Mex. 88220

[22] Filed: Feb. 25, 1972

[21] Appl. No.: 216,346

[52] U.S. Cl. ................................. 290/55, 290/44
[51] Int. Cl. ............................................. F03d 9/00
[58] Field of Search ................. 290/50, 55, 54, 42, 290/43, 44

[56] References Cited
UNITED STATES PATENTS

| | | |
|---|---|---|
| 1,181,988 | 5/1916 | Breitung .............................. 290/50 |
| 1,782,280 | 11/1930 | Willenbring ..................... 290/55 X |
| 1,369,596 | 2/1921 | Yanacopoulos ...................... 290/44 |
| 1,423,514 | 7/1922 | Butusou ........................... 290/55 X |
| 1,633,460 | 6/1927 | Silvestrin ............................. 299/55 |
| 1,654,165 | 12/1927 | Felt ................................. 290/55 X |
| 1,930,390 | 10/1933 | Jacobs ............................. 290/55 X |
| 1,212,109 | 9/1917 | Rodwick .......................... 290/55 X |
| 2,329,675 | 9/1943 | Albers............................... 290/44 X |

Primary Examiner—G. R. Simmons

[57] ABSTRACT

A device for generating electric current by the force of the wind. This device consists primarily of a turntable with arm and vane means for transferring the force of the wind to rotate a generator.

4 Claims, 2 Drawing Figures

Patented July 3, 1973  3,743,848

WIND DRIVEN POWER PRODUCING APPARATUS

This invention relates to generator devices and more particularly to a wind driven power producing apparatus.

It is therefore the primary purpose of this invention to provide a wind driven power producing apparatus which will utilize a turntable having radially spaced apart arm members with vanes pivotably attached thereto for rotating a generator so as to produce electrical power.

Another object of this invention is to provide an apparatus of the type described which will include gear means for transmitting the wind force to rotate the generator so as to produce electrical power.

Still another object of this invention is to provide an apparatus of the type described will include also trim cables, a windlass and trim motor for controlling the vane angles.

Yet another object of this invention is to provide an apparatus of the type described which will include stop members secured to the arms carrying the vanes, the stop members being secured to the trim cables.

Other objects of this invention are to provide a wind driven power producing apparatus which is simple in design, inexpensive to manufacture, rugged in construction, easy to use and efficient in operation.

These and other objects will become readily evident upon a study of the following specification together with the accompanying drawing wherein.

Figure 1:
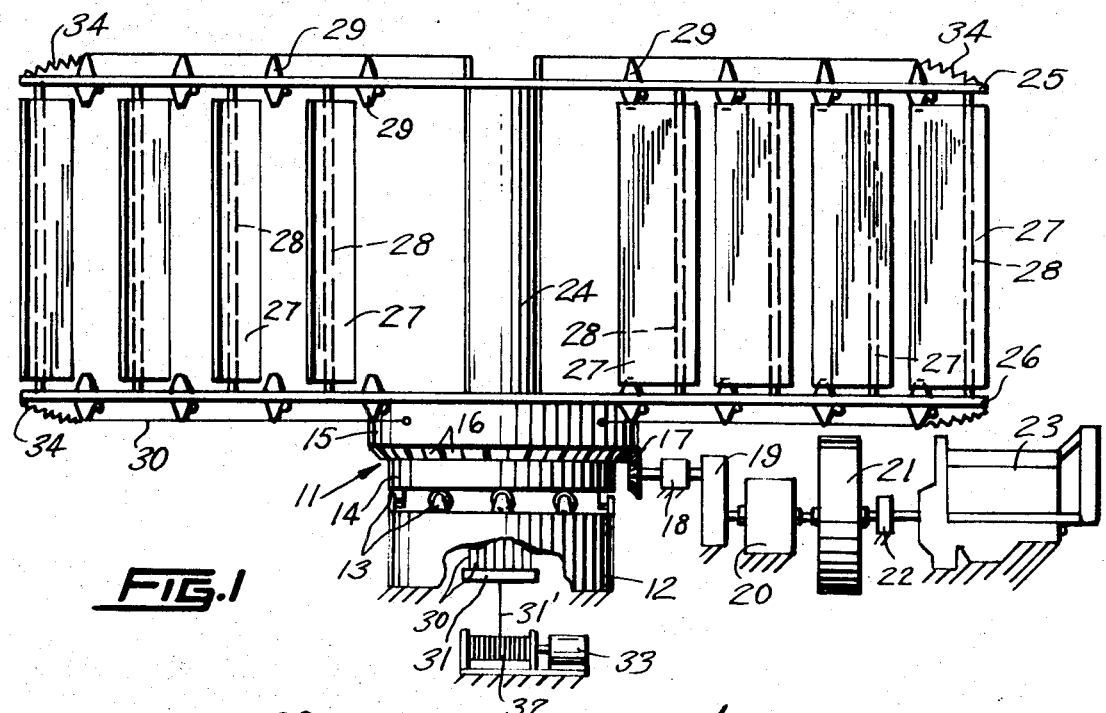
FIG. 1 is a side view of the present invention shown partly broken away.
Figure 2:
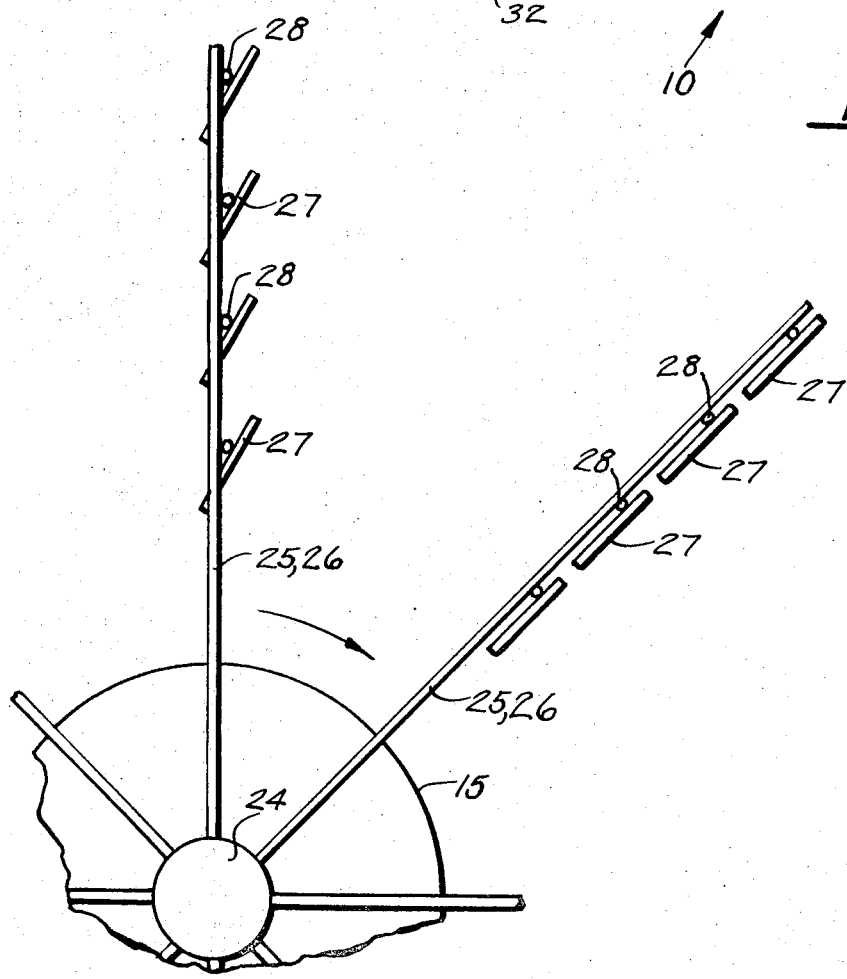
FIG. 2 is an enlarged fragmentary top plan view of FIG. 1.

According to this invention, a wind driven power producing apparatus 10 is shown to include a turntable 11 consisting of a stationary base 12 to which are affixed a plurality of radially and equally spaced apart casters 13. Casters 13 are in rolling engagement with tire 14 which is fixedly secured in a suitable manner (not shown) to a flange 15 having teeth 16.

Teeth 16 of flange 15 engage with gear 17 which is shaft connected to a torque convertor 18. Torque convertor 18 is also shaft connected to a gear box 19 which is shaft connected to generator 20. Generator 20 is shaft connected on its opposite end to fly wheel 21. Fly wheel 21 is shaft connected to a second torque convertor 22 attached to the shaft of a stand-by engine 23.

It will be noted that if the wind velocity decreases, the energy of fly wheel 21 will serve to drive the generator 20 and if the wind velocity is slow for several hours, the stand-by engine 23 may be started so as to deliver power torque-wise to generator 20 through the torque convertor 22.

Fixedly secured to the center of the flange 15 of turntable 11 is a vertical and hollow shaft 24 to which are fixedly secured a plurality of radially and equally spaced apart upper arms 25 and lower arms 26. Pivotably secured to and between arms 25 and 26 are a plurality of equally spaced apart vanes 27 which provide surface means for the wind to strike in order to rotate turntable 11 so as to produce power by means of the generator 20. The vanes 27 are secured by shaft 28 between the arms 25 and 26 and stop means 29 are secured adjacent to each of the vanes 27. A plurality of trim cables 30 are secured to the stop members 29 and to a bar 31 which is connected by cable 31' to windlass 32 which is secured to a trim motor 33.

Secured to the outer ends of arms 25 and 26 are contracting tension springs 34, the opposite ends of which are secured to the ends of the trim cables 30 lying adjacent to arms 25 and 26.

In use, the force of the wind against the vanes 27 will cause turntable 11 to rotate while the wind volocity urging the vanes 27 against the stop members 29. The rotation of turntable 11 cause rotary motion to be transferred by gear 17 to the torque convertor 18 and thus the generator 20 is rotated through the gear box 19. Wind volocity of approximately 6 miles per hour will cause apparatus 10 to generate full power and through a voltage control unit the vanes 27 on the outer ends of turntable 11 will release automatically and if the wind volocity increases, more vanes 27 will be released by the voltage regulator, thus releasing more vanes 27 thus causing them "feather" which reduces the torque produced by turntable 11, thus controling the output of the generator 20 and preventing the apparatus 10 from being destroyed by wind storms.

It shall also be noted that the springs 34 provide constant tension upon the trim tables 30.

What I now claim is:

1. A wind driven power producing apparatus comprising a caster supported turntable, gear means carried by said turntable for transmitting the rotation of the upper extremity of said turntable to an electricity producing generator, arm and vane means carried by said apparatus and rotating in horizontal plane for turning wind velocity into rotating torque for producing electricity, turntable, stop members, and spring means carried by said device for controlling the angle of said vanes, windless and trim motor means carried by said apparatus for controlling said turntable, a torque convertor, a gear box and a fly wheel means carried by said apparatus for the continuous producing of electrical power, a second torque convertor and a stand-by engine carried by said apparatus for emergency driving of said generator when wind velocity is reduced.

2. The combination according to claim 1, wherein the base of said turntable is stationary and said casters are regularly spaced apart and fixedly secured thereto and are in rolling engagement with a tire fixedly secured to an upper flange having teeth which engage the teeth of a gear secured to said first torque convertor and said gear box, said gear box, being secured by shaft means to said generator so that proper speed may be attained through the torque of the rotation of said turntable in order to produce electrical power by means of said generator.

3. The combination according to claim 2, wherein said rotation of said generator shaft simultaneously rotates said fly wheel, said fly wheel providing for rotation of said generator when wind velocity decreases so as to enable said standby motor to be started for rotating said generator if necessary.

4. The combination according to claim 3, wherein said flange member of said turntable has fixedly secured to it a vertical and hollow shaft to which trim cables are carried and said trim cables extend radially outwards and are secured to stop members attached to the upper and lower radial arms of said turntable, said stop members serving to control the angle of the pivotable vanes secured between said arms, said vanes being parallel, spaced apart and the extreme ends of said trim cables are secured to one end of contacting tension springs, the opposite ends of said contacting tension springs being secured to the outer extremities of said radial arms and by regulating the voltage said vanes may be released when excessive wind velocity occurs thus protecting said turntable of said apparatus from destruction due to excessive speed of rotation.

* * * * *